Oct. 16, 1962  W. L. SONES ET AL  3,059,168
BRUSHLESS GENERATOR RECTIFIER ASSEMBLY
Filed Dec. 7, 1959  3 Sheets-Sheet 1

INVENTORS
WILLIAM L. SONES
JOSEPH O. BURKE
BY
D. C. Staley
THEIR ATTORNEY

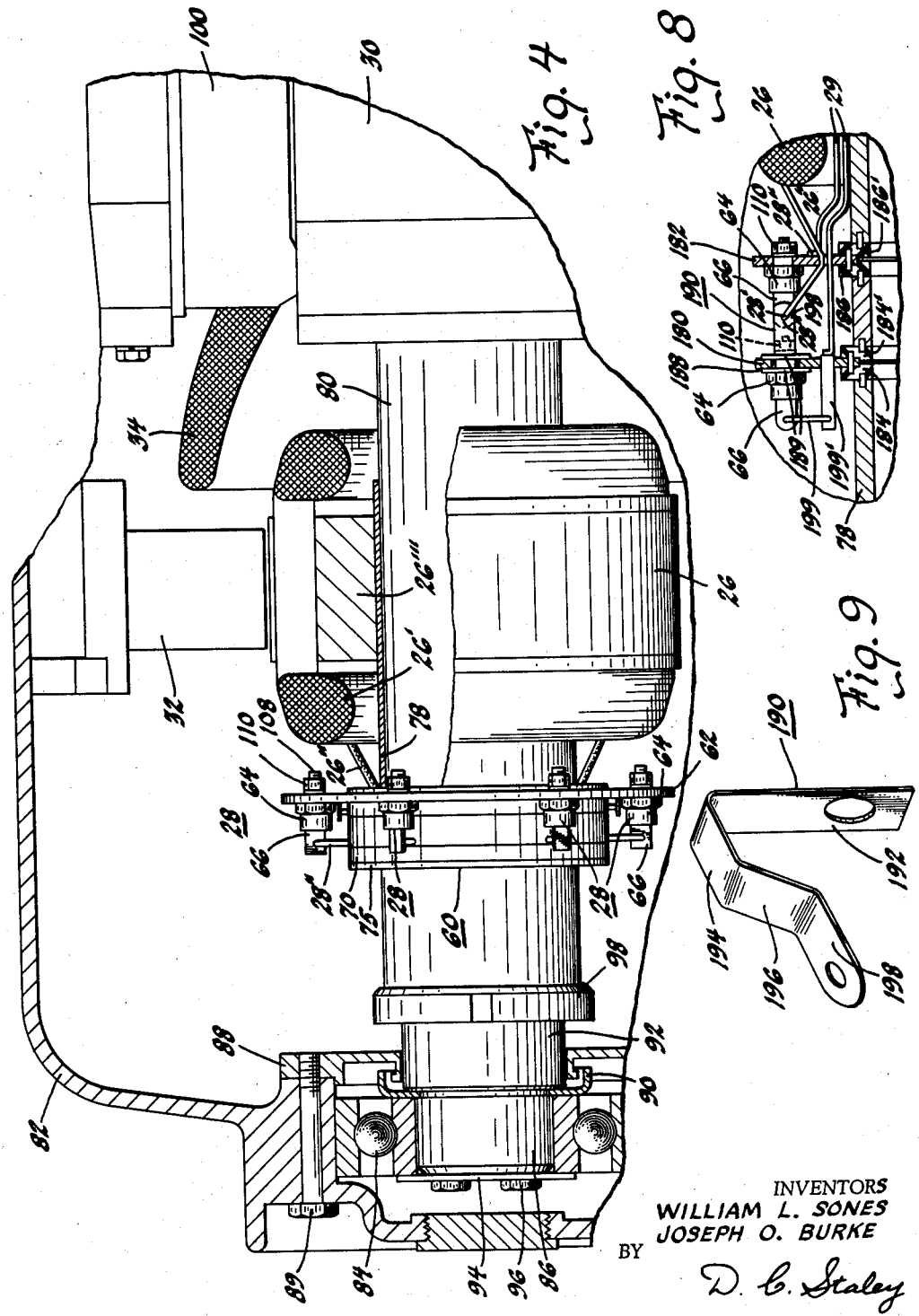

INVENTORS
WILLIAM L. SONES
JOSEPH O. BURKE

THEIR ATTORNEY

United States Patent Office 3,059,168
Patented Oct. 16, 1962

3,059,168
BRUSHLESS GENERATOR RECTIFIER ASSEMBLY
William L. Sones and Joseph O. Burke, Dayton, Ohio, assignors to General Motors Corporation, Detroit, Mich., a corporation of Delaware
Substituted for abandoned application Ser. No. 690,798, Oct. 17, 1957. This application Dec. 7, 1959, Ser. No. 857,915
17 Claims. (Cl. 322—59)

This invention relates to brushless generators, and, particularly, to rectifier assembly and mounting means for supporting silicon rectifiers that eliminate all arcing contacts on an A.C. exciter armature mounted on a common shaft with and supplying power to a rotating field of an alternator. This is a substitute case for Serial No. 690,-798, Sones et al., filed October 17, 1957, copending herewith and refiled hereby.

An object of this invention is to provide a new and compact explosion-resistant generator having an A.C. exciter entirely free of spark producing D.C. exciter parts such as a commutator, slip rings, and brushes.

Another object is to provide an exciter armature, rectifiers and rotating field forming a single rotating unit, interconnected by solid conductors to eliminate all arcing contacts on a brushless generator.

Another object of this invention is to provide a compact static rectifying means for transmitting rectified output of a rotating A.C. exciter armature mounted on the same shaft with and supplying power to a rotating field of an alternator for reduction of operational hazards in dust, sleet, snow, and explosive atmosphere such as natural gas encountered in offshore oil drilling while also providing considerable reduction of maintenance, far longer life, and virtual elimination of interference in radio and other communications or defense systems.

Another object is to provide printed-circuit-type connection and mounting means for compact rectifier means located on a shaft adjacent a rotating A.C. armature of an A.C. exciter that replaces a D.C. exciter and that is on the same shaft with and supplies power to a rotating field of an alternator made explosion resistant by elimination of all arcing contacts.

Another object is to provide annular support of connecting conductors and mounting means for compact rectifier means located on a shaft adjacent a rotating A.C. armature of an A.C. exciter that replaces a D.C. exciter and that is on the same shaft with and supplies power to a rotating field of an alternator made explosion resistant by elimination of all arcing contacts.

Another object is to provide a pair of annular conducting and mounting means for support of compact rectifier means located on a shaft that also carries adjacent thereto a rotating A.C. armature of an A.C. exciter that replaces a D.C. exciter and that is on the shaft with and supplies power to a rotating field of an alternator made explosion resistant by elimination of all arcing contacts.

Further objects and advantages of the present invention will be apparent from the following description, reference being had to the accompanying drawings wherein a preferred embodiment of the present invention is clearly shown.

In the drawings:

FIGURE 4 is a fragmentary, partially sectioned, elevational view of an alternator embodying the present invention.

FIGURE 8 is a fragmentary sectioned elevational view of a modified rectifier connecting and mounting means in accordance with the present invention.

FIGURE 9 is a perspective view of a connecting means used with the connecting and mounting means of FIGURE 8.

Figure 10:
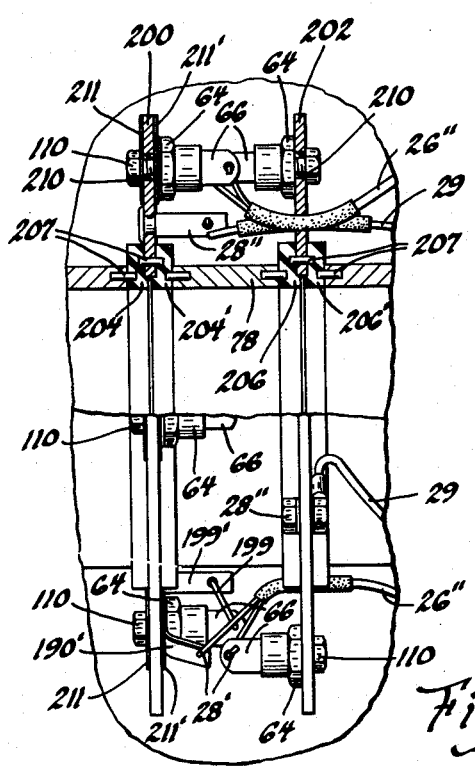

FIGURE 10 is a fragmentary sectioned and elevational view of connecting and mounting means for obtaining face to face spacing relationship of compact rectifiers located on a shaft adjacent to a rotating A.C. armature of an A.C. exciter that replaces a D.C. exciter and that is on the same shaft with and supplies power to a rotating field of an alternator made explosion resistant by elimination of all arcing contacts.

Figure 1:
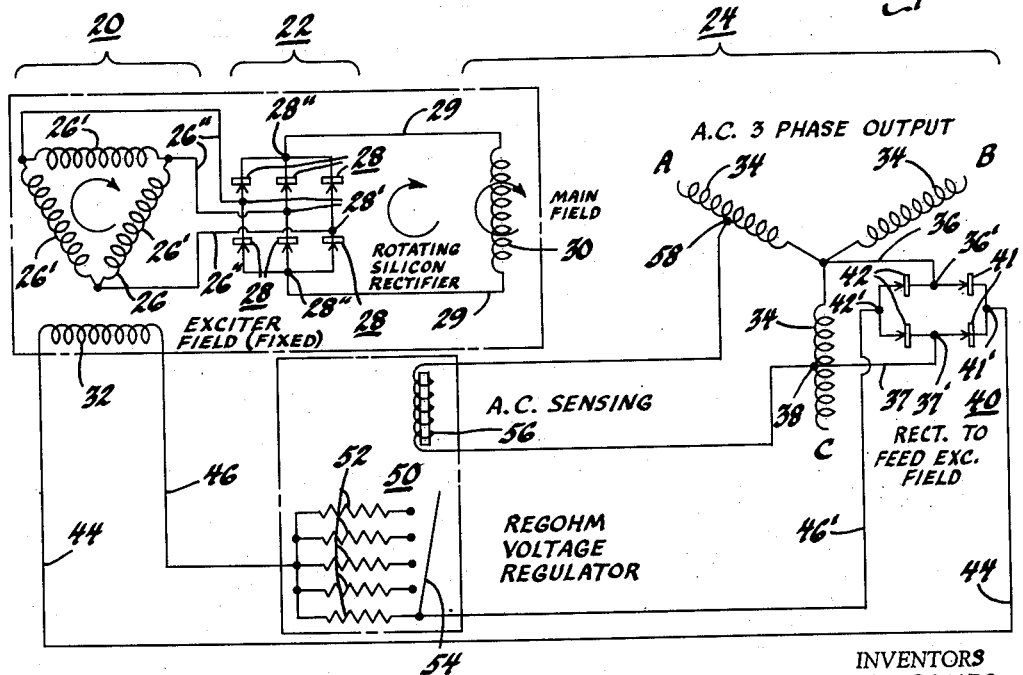
FIGURE 1 is a schematic wiring diagram for an alternator embodying the present invention.

An electrical system for an alternating current generator embodying the connecting and mounting means in accordance with the present invention is shown in FIGURE 1. The system includes an A.C. exciter generally indicated by numeral 20, a rotating rectifying means generally indicated by numeral 22 and an A.C. generator or alternator generally indicated by numeral 24. The exciter 20 has an A.C. armature indicated by numeral 26 including coils 26' which are delta connected as known to those skilled in the art. Output leads 26" from the delta connected coils 26' are connected to the input terminals 28' of rectifying means or individual silicon rectifiers 28 which collectively form the rectifying assembly 22. The rectifiers 28 have their output terminals joined at a common connection 28" for each of three rectifiers 28 of a pair of rectifier banks connected for providing full wave rectification forming a positive and negative power supply through wiring 29 connected to opposite sides of a main field winding indicated by numeral 30. The main field winding is mounted on the same shaft and rotates together with the A.C. exciter armature 26 and rectifier means 22.

The A.C. exciter 20 also includes a stationary exciter field indicated by numeral 32 and located adjacent the delta connected A.C. exciter armature windings. Since the exciter field is stationary, power can be supplied thereto in any convenient manner to control the output voltage of the exciter. The output voltage of the exciter in turn controls the input voltage into the rectifier assembly 22 and therefore the D.C. current into the field windings 30 of the main generator and consequently the output of the main generator. The rotating main field windings are electrically cooperable with stationary Y-connected coils indicated by numeral 34 which form part of the alternator 24. With the circuit as connected in FIGURE 1, three-phase alternator output voltage is available at the ends or terminals of the coils 34 as marked A, B and C.

A stationary rectifying means generally indicated by numeral 40 is connected by a wire 36 to a neutral junction N of the Y-connected coils 34 and also by a wire 37 to a center tap 38 of the coil 34 connected between the neutral junction N and output terminal C of the alternator. The rectifying means 40 thus taps a single phase of alternating current output from the alternator through wiring 36 and 37 with the output being connected through contacts 36' and 37' to the input of pairs of rectifiers 41 and 42 for full wave rectification of the single phase A.C. output from the alternator used for exciter field power supply. The output terminals of rectifiers 41 are joined to a common connection at 41' and the output of rectifiers 42 is joined in a common connection 42'. A wire 44 is connected between connection 41' and one end of the exciter field 32. The other end of the exciter field is connected by a wire 46 and 46' to the connection 42' through a rheostatic, transistor or magnetic amplifier type regulating means generally indicated by numeral 50. The regulating means 50 illustrated in FIGURE 1 is of the rheostatic type which may be referred to as a "Regohm voltage regulator." The voltage regulator is in series with the exciter field 32 as the connection is provided across connections 41' and 42' of the stationary rectifying means 40. The voltage regulator of FIGURE 1 includes a plurality of resistances 52 which may be connected in parallel relative to each other through a pivotal connecting arm 54 of a relay means. The position of the arm 54 is controlled by an A.C. sensing means including solenoid 56 connected between center tap 38 of the coil N—C and a center tap 58 of the coil N—A. Thus, the voltage regulator is sensitive to the A.C. alternator output. Changing the connections of the resistances 52 of the voltage regulating means 50 controls the D.C. exciter field excitation which in turn affects the current generated in the A.C. exciter armature 20 supplying power to the rotating rectifying means 22 which in turn provide D.C. output for excitation of the rotating D.C. main field winding of the stationary A.C. output alternator windings.

The basic principle of the brushless generator system illustrated in FIGURE 1 has been recognized previously but has proved to be impractical due to lack of acceptable rectifiers and mounting means for the rectifiers. Furthermore, the previous brushless generator systems have been dependent upon use of bulky selenium rectifying means or any other mechanically constructed rectifying assembly in which there are limitations to current carrying capacity. Furthermore, limitations in space available for brushless generators with rotating mechanical rectifying means made the use of such rectifying means highly impractical and unsatisfactory prior to the development of the present invention. Furthermore, such mechanical rectifying means often proved to be unsuitable for mounting on a shaft rotating together with an exciter armature and alternator field because of the problem of obtaining proper dynamic balance of the rotating shaft and parts carried thereon. The same space limitations rule out the use of brushes riding on a commutator and slip rings located outside of and remote from the brushless generator in an enclosure sealed in a manner designed to render the brushes and commutator means nearly explosion proof. For example, on oil rigs used for offshore drilling operations, an explosive atmosphere frequently exists as a drill encounters natural gas deposits during drilling to oil bearing strata. Offshore rigs are located on a platform above the sea where equipment and personnel must be concentrated in as small an area as possible. Space available for mounting alternating current generators on such an offshore rig is at a premium and safety hazards due to sparking often encountered with brushes riding on a commutator must be minimized or eliminated. Therefore, the brushless generator system embodying the present invention completely eliminates all D.C. exciter spark producing parts such as a commutator, slip rings and brushes. The wiring arrangement illustrated in FIGURE 1 incorporating proper regulation equipment results in an alternator having unusual flexibility and scope of application wherever danger of explosion due to sparking exists and wherever space is at a premium. Furthermore, in many brushless generator installations a minimum of maintenance is desirable because of the inaccessability to the alternator for repair purposes when the alternator is used in a location such as on an offshore oil rig.

In the present invention, since the exciter armature, rectifiers and rotating field of the alternator form a single rotating unit interconnected by solid conductors, all arcing contacts are eliminated. This not only eliminates danger of explosion but also reduces radio interference to a minimum and provides better electrical connection due to elimination of arcing contacts in the brushless generator. Since the rotating rectifiers are mounted on the same shaft with the A.C. exciter armature and D.C. field of the alternator which must initially operate, at high rotating speeds such as 1800 r.p.m.'s, connecting and mounting means must be provided for the rectifiers permitting location of the rectifiers on the rotating shaft such that the shaft is easily balanced in any suitable manner for dynamic operation and also such that a minimum of space is required for the connecting and mounting means of the rectifier. In the present invention, the A.C. exciter output is rectified by silicon rectifiers mounted radially outwardly of the axis of shaft rotation and providing D.C. excitation for the alternator field as indicated schematically in FIGURE 1. Silicon rectifiers as recently developed are very small in size and are adapted for compact mounting consuming a minimum of space on a rotating shaft assembly including the A.C. exciter armature 26, rectifier means 22, and D.C. main alternator field 30 in the present invention.

Figure 2:
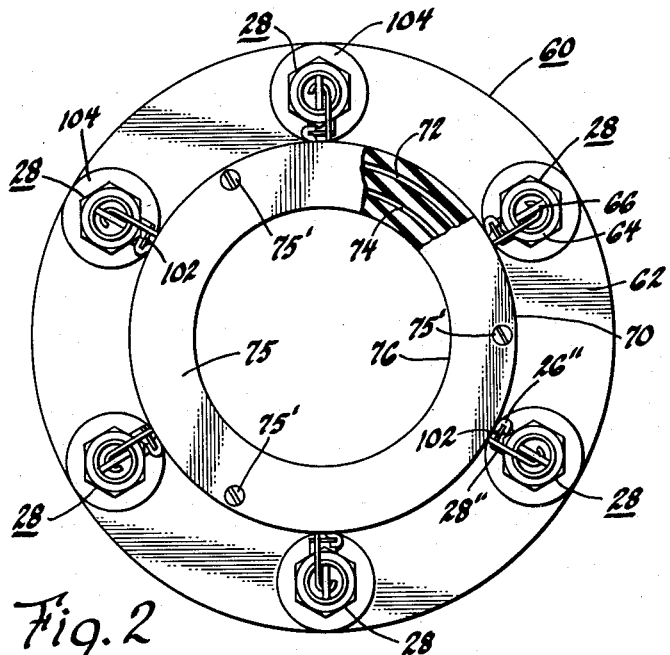
FIGURE 2 is a plan view of a rectifier connecting and mounting means in accordance with the present invention for use on an alternator.

FIGURE 2 shows silicon rectifiers or cartridges 28 located peripherally on an annular mounting means generally indicated by numeral 60. The mounting means includes an annular portion or rigid support 62 through which the rectifiers 28 are mounted as shown in a partially sectioned elevational view of FIGURE 3. Each silicon rectifier 28 has a body portion 64 and a terminal portion 66 providing input and output connections 28' and 28" respectively.

Figure 3:
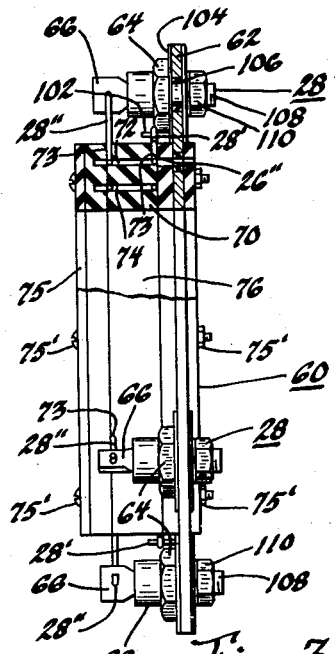
FIGURE 3 is a partially sectioned side elevational view of the rectifier connecting and mounting means of FIGURE 2.

The electrical connections for the rectifiers 28 of FIGURES 2 and 3 are made as indicated schematically in FIGURE 1. Each input connection 28' is made through wiring 26" which is supported and maintained in a positive position relative to the rectifiers 28 rotatable with a shaft using an insulating annular body portion 70 of the mounting means 60 as shown by FIGURES 2, 3 and 4. The insulating body portion 70 is provided with annular slots 72 and 74 into which the wires 26" and 28" are placed. As seen in FIGURE 3, the slots are provided with radially extending openings 73 adjacent each silicon rectifier 28 so that a radially extending portion of wires 28' and 28" can be connected to the rectifier 28. A cover portion 75 encloses the slots 72 and 74 and is attached in any suitable manner such as by head screws 75'. The annular insulating portion 70 of the mounting means 60 is provided with a central opening 76 through which a shaft on which the mounting means 60 are located can extend.

The connecting anl mounting means for the silicon rectifiers as shown in FIGURES 2 and 3 are mounted on a sleeve 78 which is attached over a shaft 80 shown in FIGURE 4. The sleeve 78 provides an external mounting surface for the interior periphery of the insulating portion 70. As shown in FIGURE 4, the shaft 80 is suitably journalled for rotation in a machine or alternator having an end frame assembly 82. Thrust bearing means 84 provide this journalling support between a reduced diameter portion 86 of the shaft 80 and the end frame 82. A bearing cap 88 is attached by screws 89 to a portion of the end frame 82 adjacent the bearing 84. A collar 90 is retained around the shaft 80 adjacent an intermediate shoulder portion 92 of the shaft 80 by a bearing locating member 94 attached by cap screws 96 to the end of the shaft 80 and holding the bearing means 84 and collar 90 against the intermediate shoulder portion 92 of the shaft. A locating nut 98 is press-fitted or threaded onto one end of the shoulder portion 92 remote from the collar 90 and serves to retain the sleeve 78 on the shaft 80 in spaced relation from the end frame.

As further seen in FIGURE 4, an A.C. armature assembly of the exciter is also located on the shaft 80 and sleeve 78. This exciter armature assembly includes the coils 26' and a rotor lamination assembly 26". The end frame assembly 82 provides support for the D.C. exciter field 32 having suitable pole and coil structure outlined but not specifically shown in FIGURE 4.

Also mounted on the shaft and rotating with the A.C. exciter armature and rectifier mounting means 60 is a rotating D.C. field 30 of the alternator adjacent stationary coils 34 located electrically cooperable relative to each other as illustrated in FIGURE 4. The fixed coils 34 are formed in a suitable manner and are supported in the frame by a stator lamination assembly 100 located radially outwardly of the rotor carrying the main field 30. Output wiring 26" is shown extending from the coils 26' of the A.C. exciter armature in FIGURE 4 toward the connecting and mounting means for the rectifiers 28. Only a short span of wire 26" as visible in FIGURE 4 between the D.C. exciter armature assembly and rectifier mounting means is free of positive annular support. As soon as the wire 26" reaches the mounting means, an annular support is provided within slot 72. The exciter output wire 26" is connected to a tab 102 bent over from an eyelet or suitable conducting connector 104 engaged with the body portion 64 of the silicon rectifier 28. The rectifier output wire 28" is connected to terminal portion 66 such as by soldering or other suitable fastening means. The wire 28" is also located in a slot 72 so that the body portion 70 of the mounting means 60 provides annular support for the wire. The shaft carrying the A.C. exciter, the rectifier connecting and mounting means, and the D.C. main field of the alternator can be rotated at high speeds because body portion 70 supports the wiring thereby eliminating any shifting and unbalance which may occur in these wires such as 28" and 26" connected with the rectifiers 28.

The rectifiers 28 are attached to the annular metal plate 62 such that the body portion 64 tightly engages the connecting means 104. An insulating bushing 106 separates a mounting stud 108 from the plate 62. A bolt 110 is threaded onto the mounting stud 108. The stud 108 and terminal portion 66 are longitudinally spaced from each other parallel to the axis of rotation of shaft 80. While the alternator assembly of FIGURE 4 illustrates rectifier mounting and connector means as described in FIGURES 2 and 3, it is to be understood that other embodiments of the present invention using silicon rectifiers can also be provided wherein different connecting and mounting means are provided on sleeve 78 mounted with the shaft 80 carrying an A.C. exciter armature, rectifying means, and main field of an alternator as in the system of FIGURE 1.

Figure 5:
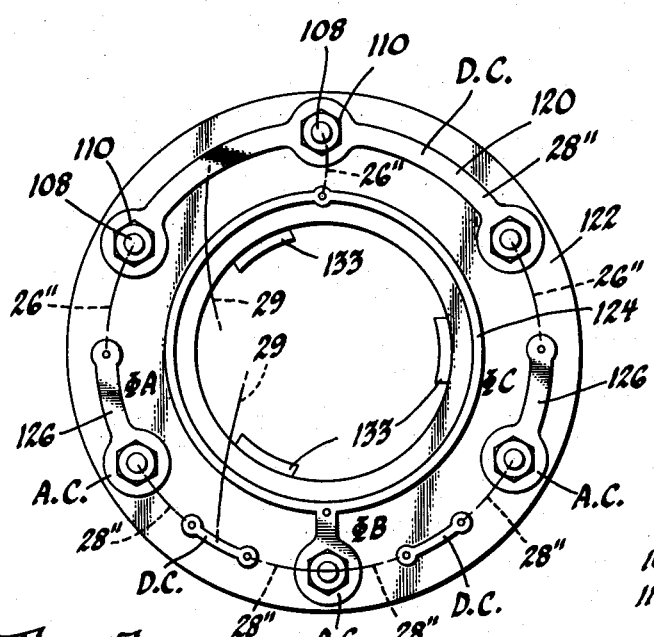
FIGURE 5 is a front plan view of a printed circuit type rectifier connecting and mounting means in accordance with the present invention for use on an alternator.
Figure 6:
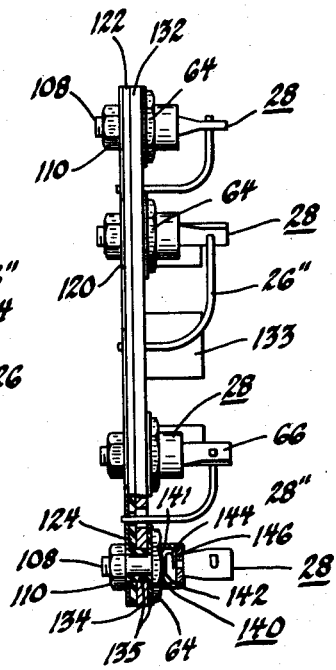
FIGURE 6 is a partially sectioned side elevational view of the rectifier connecting and mounting means of FIGURE 5.
Figure 7:
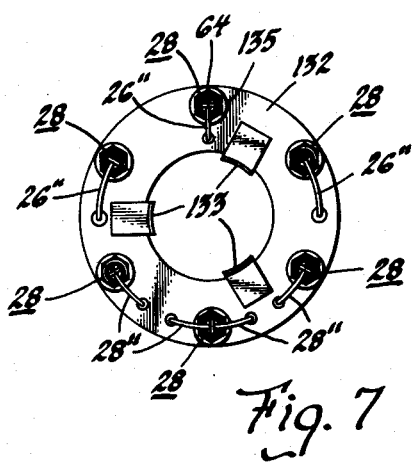
FIGURE 7 is a rear plan view of the rectifier connecting and mounting means of FIGURE 5.

A modification of the rectifier and mounting means is disclosed in FIGURES 5, 6 and 7. A silicon rectifier connecting and mounting means is provided having a printed circuit type conductor or annular connecting means 120 carried on an insulating board or base 122. The insulating base separates the conducting means 120 from other annular conducting means 124 and 126 which are electrically connected with the silicon rectifiers in accordance with the present invention. The connecting and mounting means illustrated in FIGURES 5, 6 and 7 embodying printed circuit type connections are also for use with the brushless generator represented in a three-phase system using the wiring schematic diagram of FIGURE 1. Circuit connections to rectifiers are like those shown in FIGURE 1 and it is noted that the conducting means indicated by numerals 120 and 124 form common silicon rectifier output connections indicated by numeral 28" in the schematic wiring diagram of FIGURE 1. In other words, the body portions 64 of the silicon rectifiers are joined by the common connection of a printed circuit type conductor 120, for example, through tight engagement of the mounting stud 108 and bolt 110. The conducting material 120 and 124 is attached to the insulating base 122 in any suitable manner such as bonding, for example, as known in the art of making printed circuits. Insulating means or base 122 separates the conducting means 120 and 124 from an annular metal mounting plate 132. A bushing of insulating material 134 and an insulting washer 135 separate the mounting stud 108 of each silicon rectifier from the plate 132. The mounting stud 108 and sleeve or bushing 134 of each rectifier are inserted through an aperture provided adjacent an outer peripheral edge of the insulating base 122 and metal plate 132 of the rectifier connecting and mounting means of the present invention. The terminal portions 66 of the silicon rectifiers are insulated from the body portions 64 of each of the silicon rectifiers as shown in a cut-away view of a silicon rectifier in FIGURE 6.

The rectifier 28 as seen in FIGURE 6 includes a silicon rectifying junction indicated generally by numeral 140 including one piece 141 electrically connected to body portion 64 of the silicon rectifier 28 and a second piece 142 electrically connected through a bowed spring contact 144 to the terminal portion 66 of the silicon rectifier. A glass-to-metal hermetic seal portion 146 electrically separates the terminal portion 66 from the body portion 64 of each silicon rectifier. Necessary short leads of wiring must be provided from terminal portions 66 to interconnect the rectifiers shown in FIGURES 5, 6 and 7 in accordance with the wiring diagram of FIGURE 1.

FIGURE 7 is a rear view of the rectifier connecting and mounting means of FIGURE 5 showing in further detail how the rectifiers 28 are located peripherally about the mounting means 60 including lugs 133 for supporting plate 132 relative to sleeve 78 on shaft 80 of FIGURE 4. Short wiring leads shown in FIGURES 5, 6 and 7 are identified by numerals 26" and 28" to indicate equivalent connections with the rectifiers in the wiring diagram of FIGURE 1. It is to be understood that suitable wiring is also provided to connect the rectifiers shown in FIGURES 5, 6 and 7 to the exciter armature and rotating field as indicated in FIGURE 1.

The rectifying means embodying the printed circuit type of connections as illustrated in FIGURES 5, 6 and 7 permit all of the silicon rectifiers 28 to be mounted on one metal plate 132 having the proper insulating provisions as described above. However, for purposes of maintenance it is sometimes preferable to have the rectifiers grouped according to their function in rectifying either half of the full wave rectification provided by the system of FIGURE 1. Thus, in case an electrical failure occurs in any one of the rectifiers of a particular group of rectifiers having a common connection 28"', a sub-assembly of rectifiers can be easily replaced in an alternator by replacing one of a pair of mounting metal plates such as 132 each provided for mounting three silicon rectifiers joined in one of the pair of connections 28"' illustrated in the diagram of FIGURE 1. An embodiment having rectifier mounting and connecting means in a pair of sub-assemblies is illustrated in a fragmentary cross-sectional elevational view of FIGURE 8. Annular metal mounting discs or plates 180 and 182 are carried relative to sleeve 78 by pairs of insulating discs 184—184' and 186—186', respectively. Using this type of connection permits the common connections as represented by 28"' in FIGURE 1 to be formed by plates 180 and 182 in FIGURE 8. The common connections 28' shown in FIGURE 1 are formed using a connecting means or bracket generally indicated in FIGURE 8.

A perspective view of the connecting means 120 is shown in FIGURE 9. The connecting means is a generally L-shaped structure having a base portion 192 and a laterally extending portion 194 formed by bending over one end of the base as shown in FIGURE 9. The lateral portion 194 is further bent into a slanting or oblique portion 196 which terminates in a terminal end 198 to which the output wire 26" from the A.C. exciter armature and terminal 66 of an adjacent rectifier on plate 182 are connected as shown in FIGURE 8. The base 192 is in electrical contact with a rectifier mounted on the annular plate 180 through engagement with the body portion 64 attached by bolt 110 on stud 108 as outlined in FIGURE 8. The rectifiers used with the embodiment of FIGURE 8 are adapted to serve reverse functions. In other words, the output and input for the rectifiers used on plates 180 and 182 must be reversed. Output for rectifiers mounted on plate 180 is obtained from terminal portions 66 while output of rectifiers mounted on plate 182 is obtained from body portion 64. Conversely, the input for rectifiers mounted on plate 180 is to the body portion 64 while input to rectifiers mounted on plate 182 is to the terminal portions 66. Output from terminal portions 66 of rectifiers mounted on plate 180 is transferred to plate 180 as a common connection by a short lead 199 attached to a lug 199' as shown in FIGURE 8. Bodies 64 of rectifiers on plate 180 are insulated from the plate 180 as explained below. Bodies 64 of rectifiers carried by plate 182 are not insulated from the plate 182. Plates 180 and 182 are provided to form common output connections 28'' for rectifiers mounted thereon and each output wire 29 of FIGURE 1 for connection to the main field 30 of the alternator if suitably attached thereto such as by soldering. Thus plates 180—182 form common connections of opposite polarity of rectifier D.C. power output.

Preferably, the output of the A.C. exciter as is carried to the rectifiers by wires 26'' is connected to both the terminal portion 66 of each rectifier 28 on plate 182 at a common junction with the terminal portion 198 of the bracket 190 conducting the output to the body portion 64 of each of the rectifiers 28 mounted on plate 180. Thus, in the embodiment of FIGURE 8, three silicon rectifiers are mounted on each plate and three brackets 190 are required to provide common connections 28' similar to those illustrated in FIGURE 1. The three rectifiers mounted on the plate 180 have their body portions separated from the plate 180 by insulating means or bushings 188. The body portion 64 of the silicon rectifiers mounted on plate 182 are attached directly to the metal piece 182 thus eliminating the need for insulation relative to this plate. Insulating washers 189 and 189' on opposite sides of plate 180 are also provided to separate the body portion 64 of silicon rectifiers 28 from the plate 180 but are not provided on opposite sides of plate 182.

Another embodiment of the connecting and mounting means for silicon rectifiers in accordance with the present invention is shown in a fragmentary cross-sectional elevational view in FIGURE 10. In this embodiment, a pair of annular metal members or plates indicated by numerals 200 and 202 are mounted resiliently by annular insulating means or pairs of rings 204—204' and 206—206', respectively, using necessary pins or keys 207 for interlocking the members 200 and 202 with the bushing 78 on shaft 80. Each of the body portions 64 of the silicon rectifiers 28 is separated by an insulating bushing 210 from the metal pieces or plates 200 and 202. However, body portions 64 of rectifiers mounted on plate 200 are completely insulated therefrom by the bushings and added insulating washers 211 and 211' on opposite sides of plate 200. Body portions 64 of rectifiers mounted on plate 202 are not insulated completely from plate 202 and form output connections 28'' directly with plate 202 comparable to the output connection described for rectifiers mounted on plate 182 of the FIGURE 8 embodiment. Similarly, a lead 199 and lug 199' are shown in FIGURE 10 as in FIGURE 8 connecting output from terminals 66 of rectifiers on plate 200 to the plate 202. Thus, plates 200 and 202 again are both output common connections 28'' of opposite polarity and wiring 29 for connections to the rotating field 30 of FIGURE 1 is shown in FIGURE 10. Input through wires 26'' from the A.C. exciter armature is supplied to terminals 66 for rectifiers mounted on plate 202 and through tabs 190' to body portions 64 of rectifiers mounted on plate 200. The basic difference between embodiments of FIGURES 8 and 10 is that in FIGURE 10 the rectifiers are mounted in face-to-face relationship to each other so that less longitudinal space is required to mount the rectifier mounting assembly of FIGURE 10 on a shaft such as 80 shown in FIGURE 4. The embodiments of FIGURES 8 and 10 require six silicon rectifiers but rather than having six rectifiers mounted on one annular member as described with embodiments shown by FIGURES 2–3 and FIGURES 5–7, only three rectifiers are mounted on each plate. For example, each of the metal plates 200 and 202 carries three rectifiers spaced 120° from each other on each of the metal plates or pieces.

The balancing of the connecting and mounting means provided by the plates 200 and 202 is greatly improved because rectifiers are located longitudinally adjacent to each other but spaced radially outwardly of the sleeve 78 and shaft 80. Only short wiring leads shown in part in FIGURES 8 and 10 are necessary to make electrical connections outlined by FIGURE 1. The symmetry of three rectifiers on each plate 180, 182, 200 or 202 improves static and dynamic balance of the rectifiers and mounting means relative to shaft 80 and use of groups of three rectifiers each per plate facilitates service and replacement of parts used in the brushless generator of this invention. The plates 180—182 and 200—202 form positive and negative D.C. output conductors integral with the mounting for the rectifier cartridges. Also, in each embodiment described the silicon rectifier cartridges and supporting means are provided adjacent one end of shaft 80 for easy access. Face-to-face mounting of rectifiers as shown in FIGURE 10 provides protection for the silicon rectifiers which are generally quite fragile and delicate. The plates 200 and 202 as shown in FIGURE 10 serve as shields on opposite sides of the rectifiers. The rectifiers, while being rotated, cerate sufficient air turbulence from terminal portions 66 and bodies 64 for rectifier cooling.

It is to be understood that though the embodiments of the invention disclosed are for a three-phase full wave rectification system, it is possible to use similar mounting means for silicon rectifiers of the type described for single phase electrical systems and for half-wave rectification purposes, if necessary.

While the embodiments of the present invention as herein disclosed constitute a preferred form, it is to be understood that other forms might be adopted.

What is claimed is as follows:

1. For use in a brushless generator having a fixed A.C. armature and a rotating D.C. field producing means on a shaft in common with an A.C. exciter armature supplying power to the rotating D.C. field producing means, a mounting and assembly means for rectifiers used to convert A.C. output from the A.C. exciter armature to D.C. input to the D.C. field producing means, comprising, means forming a rigid support carried on the common shaft and having a plurality of peripheral openings through which rectifiers are inserted, wiring means connecting the rectifiers with the A.C. exciter armature and D.C. field producing means, and insulating means for mounting said rigid support relative to the shaft, the rectifiers extending longitudinally of the shaft and being located radially outwardly and parallel to the shaft.

2. For use in a brushless generator having a stationary A.C. armature and a rotating D.C. field producing means on a shaft in common with an A.C. exciter armature supplying power to the rotating D.C. field producing means, a printed-circuit type connection and mounting means for rectifier means used to convert A.C. output from the A.C. exciter armature to D.C. input for the D.C. field producing means, comprising, means forming a rigid support carried on the shaft and having openings through which rectifiers are inserted and insulated from each other, a printed-circuit type conducting material carried by said support and connecting more than one of the rectifiers to each other in a common connection, and wiring means connecting the rectifiers with the A.C. exciter armature and D.C. field producing means.

3. For use in an alternator having a stationary A.C. armature and a rotating D.C. field producing means on a shaft also carrying an A.C. exciter armature for supply of power to the rotating D.C. field, a rectifier assembly and mounting means, comprising, a means forming an annular support carried on the shaft, static rectifying means for transmitting rectified output of the exciter armature to the rotating field, said static rectifying means including a plurality of silicon rectifier cartridges mounted through peripheral openings of said support means, and conducting means interconnecting said cartridges with the exciter armature output and rotating field producing means input.

4. A pair of annular conducting and mounting means for support of compact cartridge-type rectifiers on a shaft that also carries adjacent thereto toward one side a rotating A.C. armature of an A.C. exciter for energization of a rotating D.C. field producing means of an alternator made explosion resistant by elimination of all arcing contacts through use of the cartridge-type rectifiers, comprising, a pair of metal plates extending radially outwardly of the shaft, annular insulating means isolating said metal plates electrically from the shaft, a plurality of the compact cartridge-type rectifiers including terminal portions protruding longitudinally of the shaft and being mounted on each of said metal plates, said terminal portions of the rectifiers of each of said metal plates extending toward each other in face-to-face relation, and wiring means adapted to connect the A.C. exciter armature and rotating D.C. field producing means of the alternator through the rectifiers such that said metal plates form conductors in addition to said wiring means for rectified power through the cartridge rectifiers to the rotating field producing means of the alternator.

5. The mounting and assembly means for rectifiers of claim 1 wherein said insulating means for mounting said rigid support relative to the shaft includes an annular insulating body provided with at least one annular slot therein for receiving and supporting a portion of said wiring means connecting the rectifiers with the A.C. exciter armature and D.C. field producing means.

6. A pair of of annular conducting and mounting means for support of compact cartridge-type rectifiers on a shaft that also carries adjacent thereto toward one side of a rotating A.C. armature of an A.C. exciter for energization of a rotating D.C. field producing means of an alternator made explosion resistant by elimination of all arcing contacts through use of the cartridge-type rectifiers, comprising, a pair of discs of conducting material extending radially outwardly of the shaft, annular insulating means isolating said discs electrically from the shaft, a plurality of compact cartridge-type rectifiers each including a body portion and a terminal portion protruding therefrom longitudinally of the shaft, said terminal portions of rectifiers mounted on one of said discs being electrically connected to said body portions of rectifiers mounted on the other of said discs, which is insulated from said body portions, said body portions of rectifiers mounted on said first mentioned one disc being electrically engaged with said one disc used as one output polarity of power from the rectifiers while said terminal portions of the rectifiers mounted on said other disc are electrically connected to said other disc used as output of opposite polarity of power from the rectifiers, wiring means adapted to connect the output of the A.C. exciter armature to the interconnection of said terminal portions and body portions of a pair of rectifiers including one rectifier on each disc, and additional wiring means adapted to connect each polarity of each disc to the D.C. field producing means on the shaft of the alternator.

7. The conducting and mounting means of claim 6 wherein said terminal portions and body portions of a pair of rectifiers including one rectifier on each disc are interconnected by a substantially L-shaped bracket having one end attached to said terminal portion of one rectifier and an opposite end attached to said body portion of the other rectifier.

8. Means for supporting compact cartridge-type rectifiers on a shaft that also carries adjacent thereto toward one side a rotating A.C. armature of an A.C. exciter for energization of a rotating D.C. field producing means of an alternator made explosion resistant by elimination of all arcing contacts through use of the cartridge-type rectifiers, comprising, a pair of metal plates each extending radially outwardly of the shaft, annular insulating means supporting and electrically isolating said plates from the shaft, a plurality of compact cartridge-type rectifiers including terminal portions protruding longitudinally of the shaft, some of said rectifiers being mounted on each of said metal plates, said terminal portions of the rectifiers of each of said metal plates extending toward each other in face-to-face relation, tab means electrically connecting terminal portions of rectifiers mounted on one of said plates to that plate which forms a connection of one polarity of output from said rectifiers, the other of said pair of plates forming a connection of opposite polarity of output from rectifiers mounted on that plate, wiring means adapted to connect the A.C. exciter armature output with said rectifiers and additional wiring means connecting each of said pair of opposite polarity plates to the D.C. field producing means on the shaft.

9. The supporting means of claim 8 in which said annular insulating means includes a pair of insulating rings provided on opposite sides of each metal plate with pins securing said rings to an inner periphery of each plate, and said cartridge-type rectifiers mounted on each plate are each silicon rectifiers having said terminal portion of each rectifier insulated from a body portion of each rectifier, each said body portion being mounted on one of said plates.

10. For use in a brushless generator having a fixed A.C. armature and a rotating D.C. field producing means on a shaft in common with an A.C. exciter armature supplying power to the rotating D.C. field producing means, a mounting and assembly means for rectifiers used to convert A.C. output from the A.C. exciter armature to D.C. input to the D.C. field producing means, comprising, means forming a rigid support carried on the common shaft and having a plurality of peripheral openings through which rectifiers are inserted, wiring means adapted to connect the rectifiers with the A.C. exciter armature and D.C. field producing means, and insulating means for mounting said rigid support relative to the shaft, the rectifiers extending longitudinally of the shaft and being located radially outwardly and parallel to the shaft.

11. For use in an alternator, a mounting structure for rectifiers, comprising, a shaft journalled to rotate about an axis located centrally thereof, a pair of metal plates extending radially outwardly of and carried by said shaft, annular insulating means to isolate said metal plates electrically from said shaft, a plurality of compact cartridge-type rectifiers including terminal portions protruding longitudinally of said shaft and mounted in predetermined locations on each of said metal plates, said terminal portions of said rectifiers of each of said metal plates extending toward each other in face-to-face relation, and wiring means adapted to interconnect said terminal portions relative to the alternator, said metal plates having electrical engagement with said rectifiers to form conductors in addition to said wiring means and adapted to interconnect said rectifiers at other than said terminal portions relative to the alternator.

12. For use in a brushless alternator having a shaft journalled to rotate about an axis located centrally thereof, a mounting structure for rectifiers, comprising, at least one metal plate portion mounted radially outwardly on the shaft, a plurality of compact cartridge-type rectifiers each including a body means electrically engaged and mounted relative to said metal plate portion and terminal means adapted to be electrically connected in circuitry of the brushless alternator, and connector means such as wiring, printed circuit material, arcuate metal sections and the like adapted to interconnect said rectifiers for like polarity relative to said terminal means, said metal plate portion being adapted to interconnect said rectifiers for like polarity relative to said body means having polarity opposite to that of said terminal means.

13. In a brushless alternator having a shaft journalled to rotate about an axis located centrally thereof, the improvement which comprises having compact replaceable cartridge-type rectifiers each including body means and terminal means provided with the body means electrically engaged and mounted on an arcuate plate-like segment for establishment of common connection between at least two body means and connector means to join said terminal means according to like polarity.

14. For use in a brushless generator having a stationary A.C. armature and a rotating D.C. field producing means on a shaft in common with an A.C. exciter armature supplying power to the rotating D.C. field producing means, a printed-circuit type connection and mounting means for rectifier means used to convert A.C. output from the A.C. exciter armature to D.C. input for the D.C. field producing means comprising, means forming a rigid support carried on the shaft and having openings through which rectifiers are inserted and insulated from each other, a printed-circuit type conducting material carried by said support and adapted to connect more than one of the rectifiers to each other in a common connection, and wiring means adapted to connect the rectifiers with the A.C. exciter armature and D.C. field producing means.

15. For use in an alternator having a stationary A.C. armature and a rotating D.C. field producing means on a shaft also carrying an A.C. exciter armature for supply of power to the rotating D.C. field, a rectifier assembly and mounting means, comprising, a means forming an annular support carried on the shaft, static rectifying means for transmitting rectified output of the exciter armature to the rotating field, said static rectifying means including a plurality of silicon rectifier cartridges mounted through peripheral openings of said support means, and conducting means adapted to interconnect said cartridges with the exciter armature otuput and rotating field producing means input.

16. A mounting and assembly means for use in a dynamoelectric machine having a rotatable member, comprising, at least, a pair of metal plate means carried on the rotatable member, annular insulating means isolating the plate means electrically relative to the rotatable member, groups of cartridge rectifier means each having a terminal portion and having base portions mounted directly in electrical engagement with said plate means, and wiring means adapted to connect predetermined terminal portions of cartridge rectifier means to each other.

17. A mounting and support means for silicon rectifier cartridge means each having a terminal portion and base portion comprising, a rotatable dynamoelectric machine member, a metal plate means carried on said rotatable member, annular insulating means to isolate the plate means electrically relative to said rotatable member, said plate means having a location radially outwardly on said rotatable member such that the cartridge means are carried thereon in spaced relation to each other for dynamic balance during rotation, and conductor means adapted to connect predetermined terminal portions to each other, said plate means of metal having the purpose of establishing joint connection of the base portions of cartridge means radially outwardly from said rotatable member.

References Cited in the file of this patent

UNITED STATES PATENTS

| | | |
|---|---|---|
| 2,497,141 | Schultz | Feb. 14, 1950 |
| 2,740,924 | Brainard | Apr. 3, 1956 |